US011209052B2

(12) United States Patent
Yoshino et al.

(10) Patent No.: US 11,209,052 B2
(45) Date of Patent: Dec. 28, 2021

(54) MESHING ENGAGEMENT DEVICE AND CONTROLLER

(71) Applicant: TOYOTA JIDOSHA KABUSHIKI KAISHA, Aichi-ken (JP)

(72) Inventors: Hirotsugu Yoshino, Shizuoka-ken (JP); Hiroki Yasui, Mishima (JP); Takahito Endo, Shizuoka-ken (JP); Hiroaki Ebuchi, Hadano (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/869,479

(22) Filed: May 7, 2020

(65) Prior Publication Data
US 2020/0355226 A1    Nov. 12, 2020

(30) Foreign Application Priority Data

May 10, 2019   (JP) .............................. JP2019-090218

(51) Int. Cl.
  *F16H 3/44*    (2006.01)
  *F16D 23/12*   (2006.01)
(52) U.S. Cl.
  CPC ........ *F16D 23/12* (2013.01); *F16D 2023/123* (2013.01); *F16D 2500/30401* (2013.01); *F16D 2500/70416* (2013.01)
(58) Field of Classification Search
  CPC ..................... F16D 23/12; F16D 11/14; F16D 2500/30401; F16D 2500/70416; F16D 2023/123; F16D 2500/70418; F16D 2500/70402–7042
  See application file for complete search history.

(56) References Cited

U.S. PATENT DOCUMENTS

| 4,327,821 | A  | * | 5/1982  | Telford ................... F16D 11/14 |
|           |    |   |         | 192/35                                |
| 9,109,634 | B2 | * | 8/2015  | Tronnberg .............. F16D 11/10    |
| 9,976,604 | B2 | * | 5/2018  | Shiotsu .................. F16D 11/10   |
| 10,883,547| B2 | * | 1/2021  | Shiotsu .................. F16D 23/12   |
| 2015/0354643 | A1 | * | 12/2015 | Ebuchi ..................... B60K 6/38 |
|           |    |   |         | 192/69                                |
| 2016/0281792 | A1 | * | 9/2016  | Shiotsu .................. F16D 11/10  |
| 2018/0231063 | A1 | * | 8/2018  | Littlefield ............... F16D 11/16 |
| 2019/0331219 | A1 | * | 10/2019 | Shiotsu .................. F16H 63/18  |
| 2021/0033156 | A1 | * | 2/2021  | Resvoll .................. F16D 48/06  |

FOREIGN PATENT DOCUMENTS

JP    2016114227 A    6/2016

\* cited by examiner

*Primary Examiner* — Charles A Fox
*Assistant Examiner* — Farhana Pervin
(74) *Attorney, Agent, or Firm* — Hauptman Ham, LLP

(57) ABSTRACT

A meshing engagement device includes a movable member; a first engaging element; a spring member; first engaging teeth formed on the first engaging element; and a second engaging element having second engaging teeth which engage with the first engaging teeth. Further, the meshing engagement device switches between an engagement state and a disengagement state, and the engagement state includes: a first engagement state where the spring member is brought into a state where the spring member is contracted in the axial direction; and a second engagement state where the spring member is brought into a state where the spring member is further contracted in the axial direction compared to the spring member in the first engagement state.

9 Claims, 11 Drawing Sheets

MESHING ENGAGEMENT DEVICE AND CONTROLLER

CROSS-REFERENCE TO RELATED APPLICATION(S)

The present application claims priority to and incorporates by reference the entire contents of Japanese Patent Application No. 2019-090218 filed in Japan on May 10, 2019.

BACKGROUND

The present disclosure relates to a meshing engagement device and a controller.

Japanese Laid-open Patent Publication No. 2016-114227 discloses a meshing engagement device where, due to the movement of a sleeve member (dog member) having engaging teeth in an axial direction, the engaging teeth of the sleeve member and engaging teeth of an idler gear engage with each other or are disengaged from each other. This meshing engagement device includes a shift fork connected to a shift drum as a mechanism for moving the sleeve member in the axial direction. Since the sleeve member is supported on the shift fork, when the shift fork is moved in the axial direction by rotatably driving the shift drum, the sleeve member can be moved in the axial direction. Further, the sleeve member is held by a spring member and hence, a biasing force of the spring member acts on the sleeve member in an engaging direction and a disengaging direction.

SUMMARY

There is a need for providing a meshing engagement device and a controller which can suppress erroneous releasing of a meshing state between engaging teeth in a structure where a dog member is held by a spring member.

According to an embodiment, a meshing engagement device includes: a movable member configured to move in an axial direction by power from an actuator; a first engaging element connected to the movable member and configured to move in the axial direction by a thrust force given from the movable member; a spring member interposed between the movable member and the first engaging element and configured to transmit the thrust force of the movable member to the first engaging element; first engaging teeth formed on the first engaging element; and a second engaging element disposed at a position which opposedly faces the first engaging element in the axial direction, the second engaging element having second engaging teeth which engage with the first engaging teeth. Further, the meshing engagement device is configured to switch a state of engagement in response to a position of the movable member in the axial direction between an engagement state where the first engaging teeth and the second engaging teeth mesh with each other so that the first engaging element and the second engaging element are integrally rotatable and a disengagement state where the first engaging teeth and the second engaging teeth do not mesh with each other so that the first engaging element and the second engaging element are rotatable relative to each other, and the engagement state includes: a first engagement state where the spring member is brought into a state where the spring member is contracted in the axial direction; and a second engagement state where the spring member is brought into a state where the spring member is further contracted in the axial direction compared to the spring member in the first engagement state.

According to an embodiment, a controller for controlling a meshing engagement device, which includes: a movable member to move in the axial direction by power from an actuator; a first engaging element connected to the movable member, and to move in the axial direction by a thrust force given from the movable member; a spring member interposed between the movable member and the first engaging element, and to transmit the thrust force of the movable member to the first engaging element; first engaging teeth formed on the first engaging element; and a second engaging element disposed at a position which opposedly faces the first engaging element in the axial direction, the second engaging element having second engaging teeth which mesh with the first engaging teeth, so as to switch a state of engagement in response to a position of the movable member in the axial direction between an engagement state where the first engaging teeth and the second engaging teeth mesh with each other so that the first engaging element and the second engaging element are integrally rotatable and a disengagement state where the first engaging teeth and the second engaging teeth do not mesh with each other so that the first engaging element and the second engaging element are rotatable relative to each other, includes an engagement control unit to execute engagement control for switching the meshing engagement device from the disengagement state to the engagement state, the engagement control unit to execute first engagement control for controlling the engagement state to a first engagement state which is a state where the spring member is contracted in the axial direction, and to execute second engagement control for controlling the engagement state to a second engagement state which is a state where the spring member is further contracted in the axial direction compared to the spring member in the first engagement state after the first engagement control is executed.

DETAILED DESCRIPTION

In the configuration described in Japanese Laid-open Patent Publication No. 2016-114227, when a state of engagement is switched from a disengagement state to an engagement state, the engaging teeth of the sleeve member are made to mesh with the engaging teeth of the idler gear in a state where the spring member is compressed in the axial direction. Accordingly, in the engagement state, the spring member functions as a waiting spring, and a biasing force of the spring member acts on the sleeve member in the engaging direction.

However, in the structure where the sleeve member (dog member) is held by the spring member, when a load in the disengaging direction occurs on the dog member in an engagement state due to disturbance such as vibration, there may arise a case where the dog member moves in the disengaging direction against a biasing force of the spring member. Accordingly, even when maintaining of an engagement state is desired, engaging teeth of the dog member disengage from engaging teeth of the idler gear. As a result, there is a concern that a meshing state between the engaging teeth is erroneously disengaged.

Hereinafter, a meshing engagement device and a controller according to an embodiment of the present disclosure are specifically described with reference to the accompanying drawings. Note that the present disclosure is not limited to the embodiments described below.

Figure 1:
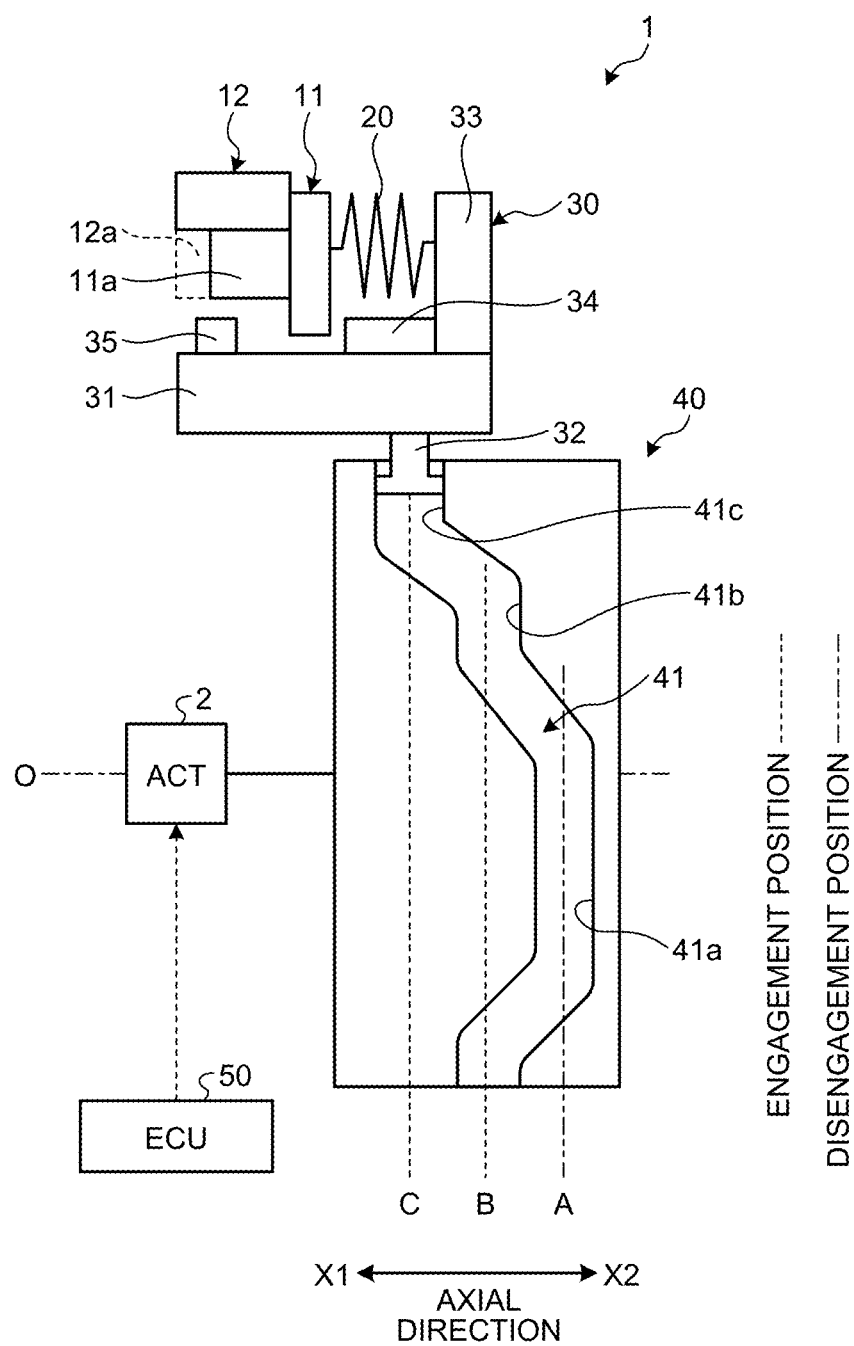
FIG. 1 is a view schematically illustrating a meshing engagement device according to an embodiment.

FIG. 1 is a view schematically illustrating a meshing engagement device according to an embodiment. In FIG. 1, a direction along a rotation center axis O is described as an axial direction. In the axial direction, one side in the axial direction is described as an engaging direction X1, and the other side in the axial direction is described as a disengaging direction X2. In the description made hereinafter, these directions are described in the same manner.

A meshing engagement device 1 is an engagement device which, by driving of an actuator (ACT) 2, switches the state of engagement between an engagement state where first engaging teeth 11a of a first dog member 11 and second engaging teeth 12a of a second dog member 12 mesh with each other and a disengagement state where the first engaging teeth 11a and the second engaging teeth 12a do not mesh with each other. As illustrated in FIG. 1, the meshing engagement device 1 includes the first dog member 11, the second dog member 12, a spring member 20, a movable member 30, and a shift drum 40.

The first dog member 11 is a first engaging element formed in a circular annular shape, and is a rotary member which rotates on the rotation center axis O. The first dog member 11 is disposed so as to oppositely face the second dog member 12 in the axial direction. A plurality of first engaging teeth 11a which are disposed at a predetermined interval in the circumferential direction are formed on a surface of the first dog member 11 which oppositely faces the second dog member 12 in the axial direction. The first engaging teeth 11a are dog teeth having a shape protruding in the axial direction, and protrude toward a second dog member 12 side. The first dog member 11 is configured to be movable in the axial direction. The meshing engagement device 1 adopts the structure where a rotational force of the first dog member 11 cannot be transmitted to the movable member 30 by way of the spring member 20. For example, the first dog member 11 is rotatable relative to the spring member 20.

The second dog member 12 is a second engaging element formed in a circular annular shape, and is a rotary member which rotates on the rotation center axis O. A plurality of second engaging teeth 12a which are disposed at a predetermined interval in the circumferential direction are formed on the second dog member 12 at positions corresponding to the first engaging teeth 11a of the first dog member 11. The second engaging teeth 12a are dog teeth having a shape capable of engaging with the first engaging teeth 11a. In the example illustrated in FIG. 1, the second engaging teeth 12a protrude inward in the radial direction from a circular annular main body of the second dog member 12. That is, the second engaging teeth 12a are formed of spline teeth. Accordingly, a meshing portion between the first dog member 11 and the second dog member 12 is formed of the first engaging teeth 11a protruding in the axial direction and the second engaging teeth 12a protruding in the radial direction. The second dog member 12 is not movable in the axial direction, and rotates in a state where the axial position of the second dog member 12 is fixed.

The spring member 20 is an elastic member which expands and contracts in the axial direction, and is a member which applies a load on the first dog member 11 in the engaging direction X1. The spring member 20 generates a biasing force (elastic force) by being compressed in the axial direction. For example, the spring member 20 is formed of a coil spring.

As illustrated in FIG. 1, the spring member 20 is disposed so as to press a surface (back surface) of the first dog member 11 on a side opposite to the first engaging teeth 11a, and the spring member 20 is sandwiched between the first dog member 11 and the movable member 30 in the axial direction. The spring member 20 is compressed when the first dog member 11 and the movable member 30 move relative to each other in the axial direction. In a state where the spring member 20 is compressed in this manner, a biasing force of the spring member 20 acts on the first dog member 11 as a load in the engaging direction X1. That is, the spring member 20 is a member which applies a thrust force (a force in the axial direction) to the first dog member 11. The spring member 20 is configured to be rotatable relative to the movable member 30. For example, a bearing (not illustrated in the drawing) is disposed between the spring member 20 and the movable member 30.

The movable member 30 is a member which moves in the axial direction in response to an operation of the actuator 2, and is a member which applies a thrust force to the first dog member 11. The movable member 30 also functions as a member for holding the spring member 20. That is, the movable member 30 is configured such that a thrust force of the movable member 30 acts on the first dog member 11 by way of the spring member 20.

As illustrated in FIG. 1, the movable member 30 includes a body portion 31, an engaging pin 32, a holding portion 33, a first stopper portion 34, and a second stopper portion 35. The body portion 31 is a portion formed in a circular cylindrical shape, and strokes in the axial direction while being arranged on the rotation center axis O. Since the body portion 31 is integrally formed with the engaging pin 32, the holding portion 33, the first stopper portion 34, and the second stopper portion 35 which form other portions. Accordingly, the body portion 31 moves in the axial direction integrally with other portions.

The engaging pin 32 is mounted on an inner peripheral portion of the body portion 31, and protrudes inward in the radial direction from the body portion 31. The engaging pin 32 is a portion which forms a connecting portion with the shift drum 40. The engaging pin 32 engages with a shift groove 41 formed on the shift drum 40. When the shift drum 40 rotates, the position of the engaging pin 32 in the axial direction changes. When the position of the engaging pin 32 in the axial direction changes, the body portion 31 strokes in the axial direction.

The holding portion 33 is a portion which holds the spring member 20. The holding portion 33 is formed of a flange portion which extends outward in the radial direction from the body portion 31. The holding portion 33 is disposed at an end portion of the body portion 31 on a disengaging direction X2 side, and has a shape opposedly facing the first dog member 11 in the axial direction. With such a configuration, the spring member 20 can be disposed in a state where the spring member 20 is sandwiched between the first dog member 11 and the holding portion 33.

The first stopper portion 34 is a portion which restricts the movement of the first dog member 11 in the disengaging direction X2. On the other hand, the second stopper portion 35 is a portion which restricts the movement of the first dog member 11 in the engaging direction X1. The first stopper portion 34 and the second stopper portion 35 are mounted on an outer peripheral portion of the body portion 31. The first stopper portion 34 and the second stopper portion 35 are disposed on both sides of an inner peripheral portion of the first dog member 11 in the axial direction. As illustrated in FIG. 1, the first stopper portion 34 is disposed on the body portion 31 at a position close to an end portion of the body portion 31 on a disengaging direction X2 side in the axial direction, and is disposed on a side closer to the holding portion 33 than the first dog member 11. The second stopper portion 35 is disposed on the body portion 31 at a position close to an end portion of the body portion 31 on an engaging direction X1 side in the axial direction. The second stopper portion 35 is a portion provided for preventing the first dog member 11 from being removed from the body portion 31 in the axial direction.

The shift drum 40 is a member which transmits the power of the actuator 2 to the movable member 30, and is a rotary member formed in a circular cylindrical shape. The shift drum 40 is disposed on the rotation center axis O, and rotates when the actuator 2 is driven. The shift drum 40 is rotatable without changing its position in the axial direction. As illustrated in FIG. 1, the shift drum 40 is disposed inside the movable member 30 in the radial direction. The shift groove 41 with which the engaging pin 32 of the movable member 30 engages is formed on an outer peripheral portion of the shift drum 40.

The shift groove 41 is a groove portion formed continuously in the circumferential direction of the shift drum 40. The shift groove 41 has a shape in which the position of the groove portion in the axial direction changes as the position of the shift groove 41 in the circumferential direction changes. The shape of the shift groove 41 is formed such that the shift groove 41 includes, depending on the position of the shift drum 40 in the circumferential direction (rotational phase), a first groove portion 41a which corresponds to a disengagement position A in the axial direction, a second groove portion 41b which corresponds to a first engagement position B in the axial direction, and a third groove portion 41c which corresponds to a second engagement position C.

The shift groove 41 is formed continuously over an entire circumferential area of the shift drum 40. The first groove portion 41a is connected to the third groove portion 41c through the second groove portion 41b. The shift groove 41 is formed of the first groove portion 41a, the second groove portion 41b, and the third groove portion 41c which are disposed at different positions in the axial direction in order from a disengaging direction X2 side to an engaging direction X1 side in the axial direction.

The first groove portion 41a linearly extends along the circumferential direction by a predetermined length at the disengagement position A in the axial direction. In this manner, the first groove portion 41a extends linearly along the circumferential direction and hence, even when the shift drum 40 rotates by a predetermined amount in a state where the engaging pin 32 engages with the first groove portion 41a, the position of the engaging pin 32 in the axial direction can be maintained at the disengagement position A.

The second groove portion 41b extends linearly along the circumferential direction by a predetermined length at the first engagement position B in the axial direction. In this manner, the second groove portion 41b extends linearly along the circumferential direction and hence, even when the shift drum 40 rotates by a predetermined amount in a state where the engaging pin 32 engages with the second groove portion 41b, the position of the engaging pin 32 in the axial direction can be maintained at the first engagement position B. Note that the second groove portion 41b corresponds to the first engagement groove portion of the present disclosure.

The third groove portion 41c linearly extends along the circumferential direction by a predetermined length at the second engagement position C in the axial direction. In this manner, the third groove portion 41c extends linearly along the circumferential direction, even when the shift drum 40 rotates by a predetermined amount in a state where the engaging pin 32 engages with the third groove portion 41c, the position of the engaging pin 32 in the axial direction can be maintained at the second engagement position C. Note that the third groove portion 41c corresponds to the second engagement groove portion of the present disclosure.

The engaging pin 32 which engages with the shift groove 41 performs the engagement in a state where the engaging pin 32 is brought into contact with wall surfaces (groove wall portions) of the shift groove 41, and is pushed in the axial direction from the groove wall portions. Accordingly, when the shift drum 40 rotates, the engaging pin 32 can move in the axial direction along the shape of the shift groove 41. In this manner, a rotational force can be converted into a thrust force (a force in the axial direction) by the shift drum 40 and the movable member 30 and hence, the first dog member 11 can be moved in the axial direction by the actuator 2.

The actuator 2 is provided for operating the first dog member 11 in the axial direction, and is driven so as to rotate the shift drum 40. For example, the actuator 2 is formed of an electrically-operated motor disposed on the rotation center axis O. In this case, a rotation shaft (an output shaft) of the actuator 2 and the shift drum 40 are connected to each other so as to enable the transmission of power from the actuator 2 to the shift drum 40.

The meshing engagement device 1 having such a configuration includes, as a mechanism for moving the first dog member 11 in the axial direction, the movable member 30 which performs the linear movement and the shift drum 40 which performs rotational movement. When the actuator 2 is driven, the shift drum 40 rotates, and this rotational movement of the shift drum 40 acts on the movable member 30 by way of the engaging pin 32. Accordingly, the movable member 30 moves in the axial direction. The meshing engagement device 1 also includes an electronic control unit (hereinafter, referred to as an ECU) 50 which controls the actuator 2.

The ECU 50 includes a CPU, a memory unit in which data such as various programs are stored, and an arithmetic processing unit which performs various calculations for controlling an input-side driving force and an output-side braking force. The ECU 50 receives signals from various sensors. For example, signals from a first rotational speed sensor which detects a rotational speed of the first dog member 11, a second rotational speed sensor which detects a rotational speed of the second dog member 12, and the like are inputted to the ECU 50.

By controlling the actuator 2 by the ECU 50, it is possible to switch a state of the meshing engagement device 1 between an engagement state where the first dog member 11 and the second dog member 12 mesh with each other and a disengagement state where the meshing state is disengaged. The ECU 50 includes an engagement control unit which performs an engagement control for switching a state of the meshing engagement device 1 from a disengagement state to an engagement state.

The ECU 50 can change a rotation phase of the shift drum 40 by controlling a rotation phase of the actuator 2. The position of the shape of the shift groove 41 in the axial direction changes corresponding to the rotational phase (position in the circumferential direction) of the shift drum 40. In a case where the engaging pin 32 engages with the first groove portion 41a, the meshing engagement device 1 is brought into a disengagement state. In a case where the engaging pin 32 engages with the second groove portion 41b, the meshing engagement device 1 can be brought into a first engagement state. In a case where the engaging pin 32 engages with the third groove portion 41c, the meshing engagement device 1 is brought into a second engagement state. Accordingly, the engagement control unit of the ECU 50 executes first engagement control where the meshing engagement device 1 is controlled to assume the first engagement state, and executes the second engagement control where the meshing engagement device 1 is controlled to assume the second engagement state.

When the ECU 50 executes the first engagement control, the ECU 50 changes a rotation phase of the actuator 2 such that an operation amount of the actuator 2 becomes an operation amount corresponding to the first engagement state. In the same manner, when ECU 50 executes the second engagement control, the ECU 50 changes a rotation phase of the actuator 2 such that an operation amount of the actuator 2 becomes an operation amount corresponding to the second engagement state.

The ECU 50 can specify the position of the engaging pin 32 in the axial direction based on the rotation phase of the actuator 2. For example, in a case where the actuator 2 and the shift drum 40 are directly connected to each other, the rotation phase of the actuator 2 directly becomes the rotation phase of the shift drum 40.

Accordingly, the groove portion of the shift groove 41 with which the engaging pin 32 engages can be specified so that the position of the engaging pin 32 in the axial direction can be specified. In a case where the actuator 2 and the shift drum 40 are connected to each other so as to be able to transmit power by way of a speed reduction mechanism, the ECU 50 can calculate a rotation phase of the shift drum 40 by making use of a speed change ratio of the speed reduction mechanism and a rotation phase of the actuator 2 so that the position of the engaging pin 32 in the axial direction can be specified. That is, the ECU 50 can determine whether the position of the engaging pin 32 in the axial direction is the first engagement position B or the second engagement position C based on a rotation phase of the actuator 2 without using a sensor such as a stroke sensor. That is, when the ECU 50 executes engagement control, the ECU 50 can determine whether the meshing engagement device 1 is in the first engagement state or in the second engagement state based on an operation amount of the actuator 2.

The disengagement state and the engagement state of the meshing engagement device 1 will be described hereinafter with reference to FIGS. 2 to 5. In FIGS. 2 to 5, the actuator 2 and the ECU 50 are omitted. The state of engagement is described with respect to the first state, the second state and the third state in a separated manner based on the position of the engaging pin 32 in the axial direction. The state of engagement is also described with respect to a disengagement state, a first engagement state, a ratcheting state, and a second engagement state based on a state of the meshing portion between the first engaging teeth 11a and the second engaging teeth 12a.

Figure 2:
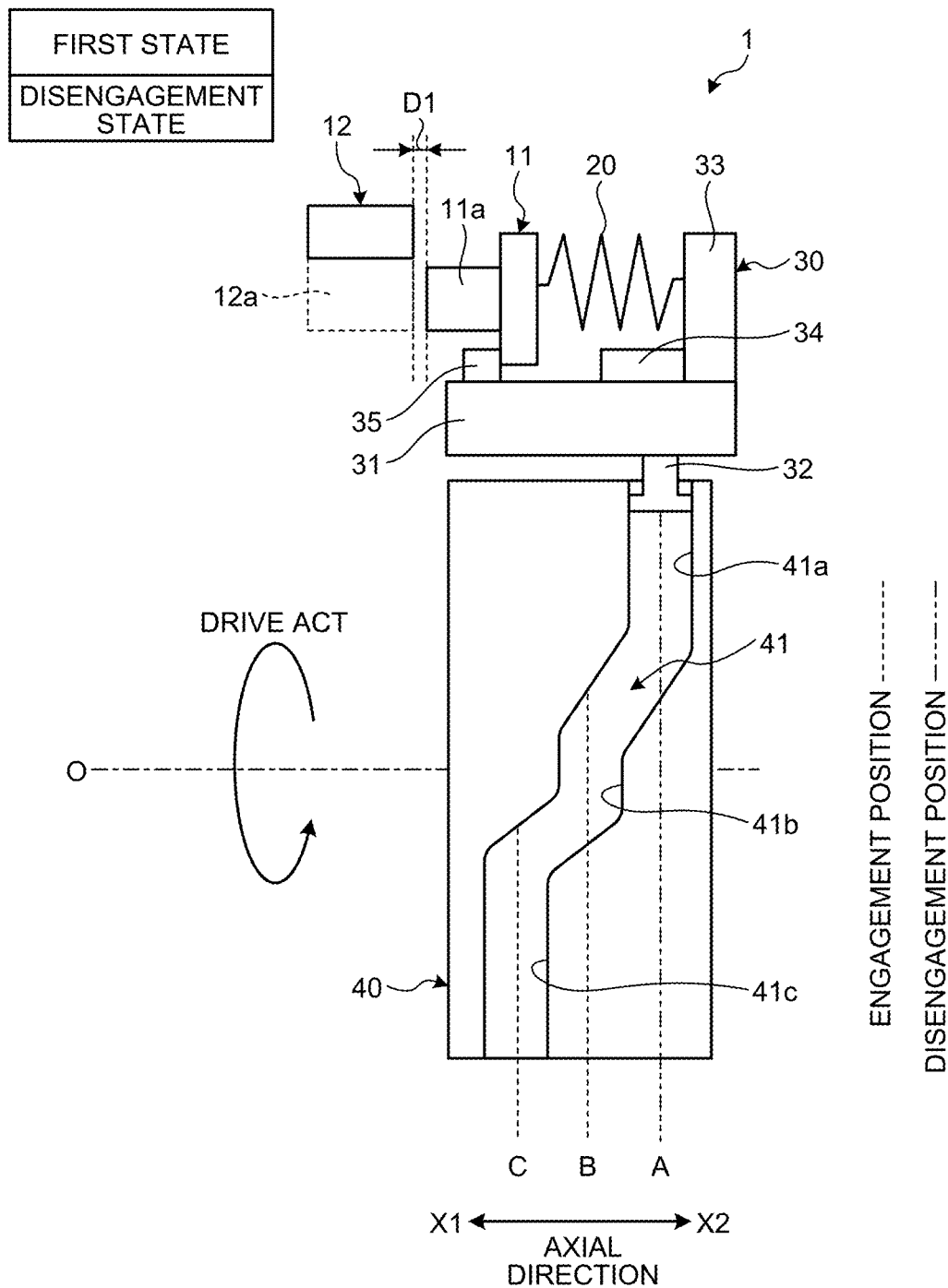
FIG. 2 is a schematic view illustrating the meshing engagement device in a first state.

FIG. 2 is a schematic view illustrating the meshing engagement device 1 in the first state. The first state means a state where the position of the engaging pin 32 in the axial direction is at the disengagement position A. That is, the first state is a state where the engaging pin 32 engages with the first groove portion 41a. The meshing engagement device 1 in the first state assumes a disengagement state where the first dog member 11 and the second dog member 12 do not mesh with each other. That is, the first state is synonymous with the disengagement state.

As illustrated in FIG. 2, in the first state, the movable member 30 is positioned relatively on a disengaging direction X2 side within a stroke range. Accordingly, the position of the first dog member 11 in the axial direction assumes a position where the first dog member 11 cannot be brought into contact with the second dog member 12. A gap D1 in the axial direction is formed between the first engaging teeth 11a and the second engaging teeth 12a. The first dog member 11 is biased toward an engaging direction X1 side by a biasing force of the spring member 20. In this case, the first dog member 11 is brought into contact with the second stopper portion 35.

The ECU 50 includes an engagement control unit which performs engagement control for switching a state of the meshing engagement device 1 from a disengagement state to an engagement state. The ECU 50 drives the actuator 2 so as to rotate the shift drum 40 in the first state in an engaging direction, and shifts the state of the meshing engagement device 1 from the first state to the second state. The second state means a state where the position of the engaging pin 32 in the axial direction assumes the first engagement position B. That is, the second state is a state where the engaging pin 32 engages with the second groove portion 41b.

During shifting of the state of the meshing engagement device 1 from the first state to the second state, the ECU 50 changes the rotation phase of the shift drum 40 such that the position of the engaging pin 32 in the axial direction changes from the disengagement position A to the first engagement position B. In a shifting step where the engagement position of the engaging pin 32 changes from the first groove portion 41a to the second groove portion 41b along with the rotation of the shift drum 40, out of the groove wall portions of the shift groove 41, the wall surface on a disengaging direction X2 side pushes the engaging pin 32 toward an engaging direction X1 side. Then, when the position of the engaging pin 32 in the axial direction assumes the first engagement position B, the shifting of the state of the meshing engagement device 1 from the first state to the second state has been completed.

Figure 3:
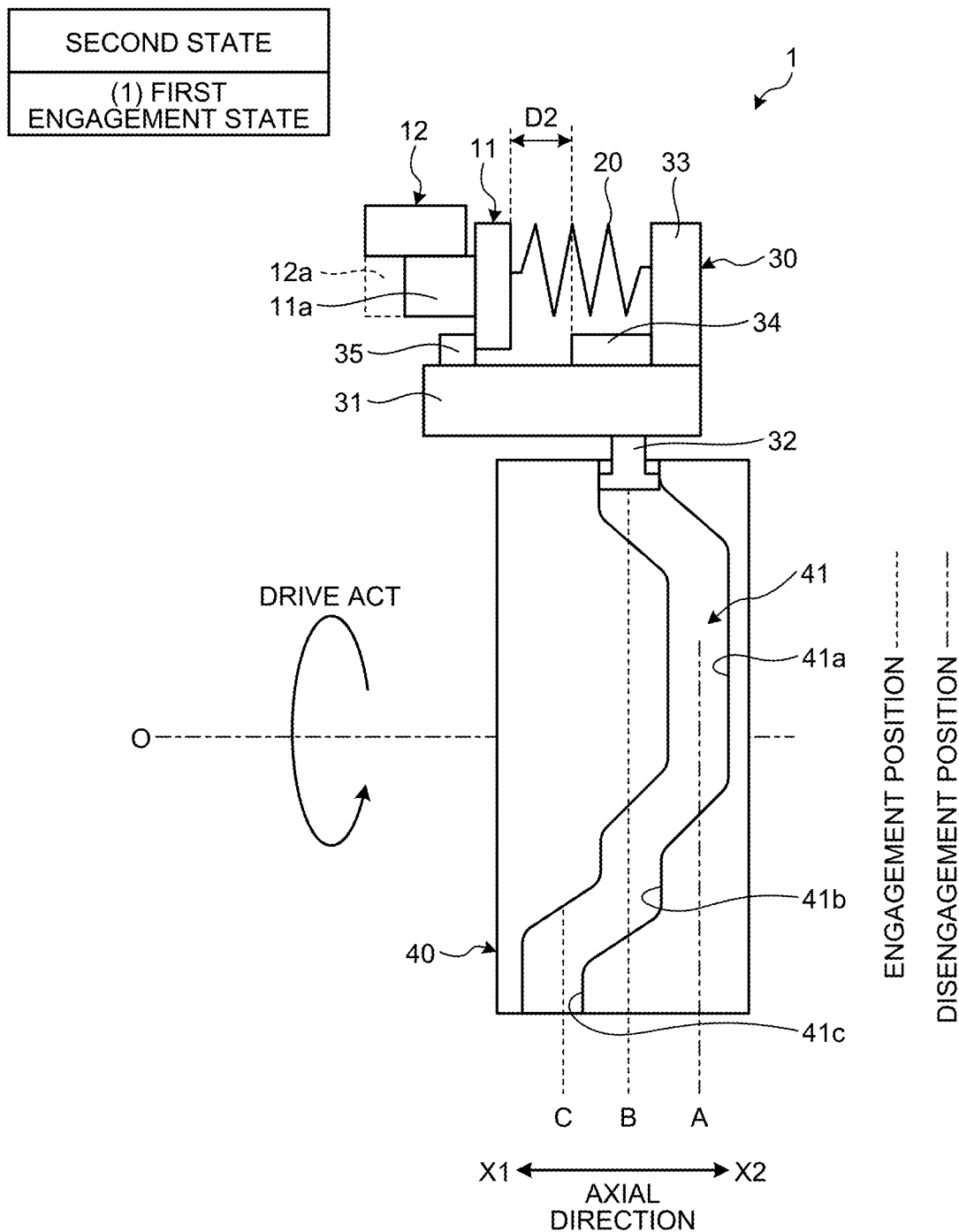
FIG. 3 is a schematic view illustrating the meshing engagement device when the meshing engagement device is brought into a first engagement state in a second state.
Figure 4:
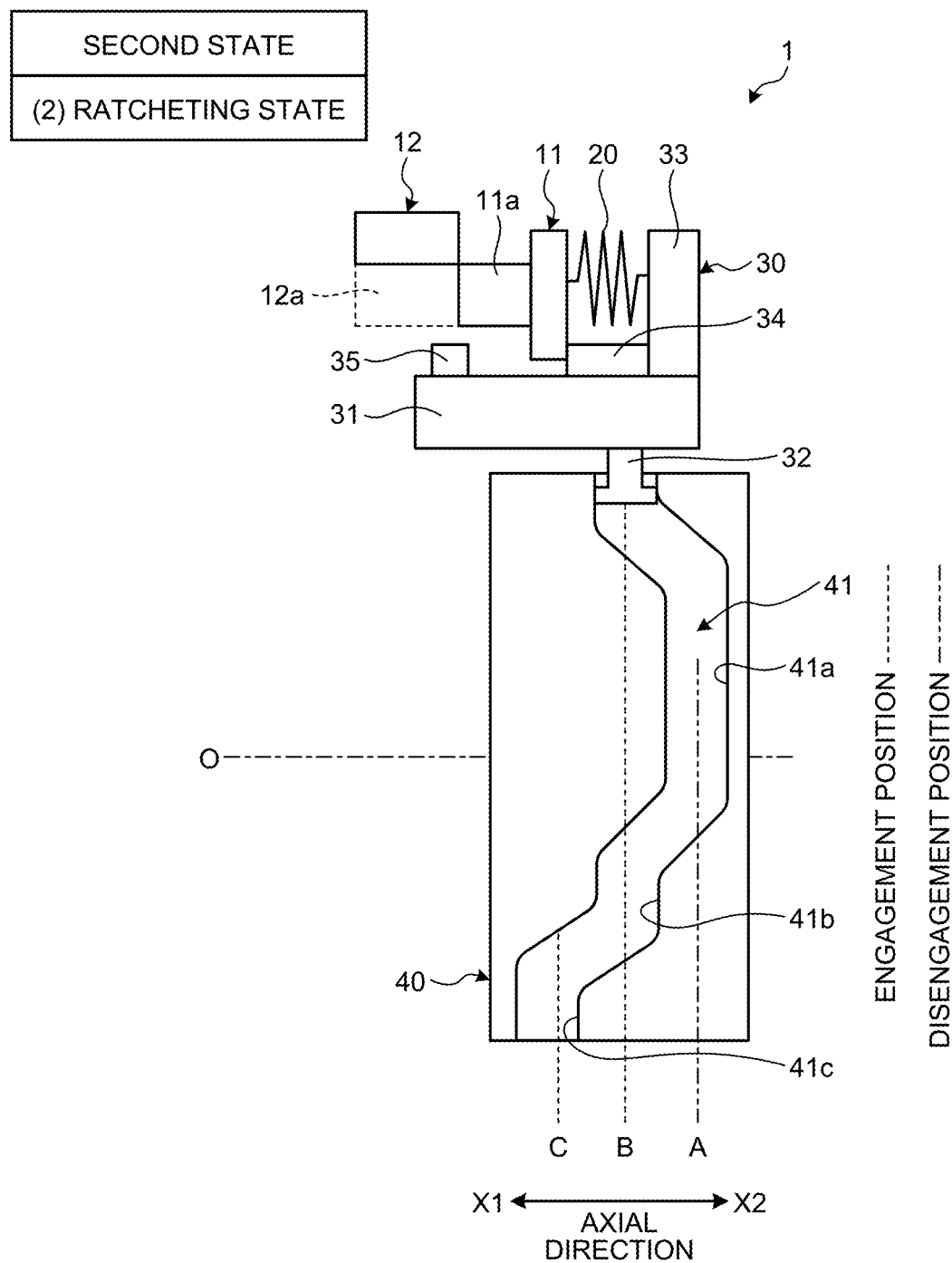
FIG. 4 is a schematic view illustrating the meshing engagement device when the meshing engagement device is brought into a ratcheting state in the second state.

The second state includes a first engagement state where the engaging teeth 11a and 12a mesh with each other (illustrated in FIG. 3) and a ratcheting state where the engaging teeth 11a and 12a do not mesh with each other (illustrated in FIG. 4).

FIG. 3 is a schematic view illustrating the meshing engagement device 1 when the meshing engagement device 1 assumes the first engagement state in the second state. In a case where the meshing engagement device 1 assumes the first engagement state in the second state, in a state where the position of the engaging pin 32 in the axial direction assumes the first engagement position B, the first engaging teeth 11a of the first dog member 11 mesh with the second engaging teeth 12a of the second dog member 12. In the first engagement state, the first engaging teeth 11a mesh with the second engaging teeth 12a, and the first dog member 11 and the second dog member 12 rotate integrally. That is, the case where the meshing engagement device 1 assumes the first engagement state in the second state is synonymous with the engagement state.

As illustrated in FIG. 3, in the case where the meshing engagement device 1 assumes the second state, the movable member 30 strokes toward the engaging direction X1 side until the movable member 30 reaches the position in the axial direction where the first engaging teeth 11a of the first dog member 11 can mesh with the second engaging teeth 12a of the second dog member 12. In the case where the meshing engagement device 1 assumes the first engagement state, in a state where the first dog member 11 is pushed toward an engaging direction X1 side by a biasing force of the spring member 20 and is brought into contact with the second stopper portion 35, the first engaging teeth 11a mesh with the second engaging teeth 12a of the second dog member 12. The movable member 30 and the first dog member 11 are configured to be relatively movable from each other in the axial direction by way of the spring member 20. That is, the case where the meshing engagement device 1 assumes the first engagement state in the second state is the case where the meshing engagement device 1 assumes the state where the movable member 30 strokes toward an engaging direction X1 side and reaches the engageable position of the meshing portion, and the state where the first dog member 11 strokes toward an engaging direction X1 side and reaches the position where the first engaging teeth 11a and the second engaging teeth 12a mesh with each other.

FIG. 4 is a schematic view illustrating the meshing engagement device 1 when the meshing engagement device 1 assumes the ratcheting state in the second state. The ratcheting state means a state where the first engaging teeth 11a of the first dog member 11 are snapped by the second engaging teeth 12a of the second dog member 12. That is, when the meshing engagement device 1 assumes the ratcheting state, the first engaging teeth 11a and the second engaging teeth 12a do not mesh with each other, and the first dog member 11 and the second dog member 12 rotate relative to each other. In other words, when the meshing engagement device 1 assumes the ratcheting state in the second state, in a state where the position of the engaging pin 32 in the axial direction assumes the first engagement position B, the first engaging teeth 11a of the first dog member 11 do not mesh with the second engaging teeth 12a of the second dog member 12.

As illustrated in FIG. 4, in the ratcheting state, in a state where the movable member 30 strokes toward an engaging direction X1 side and reaches the engageable position of the meshing portion, the first engaging teeth 11a are snapped by the second engaging teeth 12a. Accordingly, the first dog member 11 exists at the position away from the second stopper portion 35 toward a disengaging direction X2 side. That is, the position of the first dog member 11 in the axial direction in the ratcheting state is closer to the disengaging direction X2 side than the position of the first dog member 11 in the axial direction in the first engagement state. Accordingly, the spring member 20 in the ratcheting state is in a more compressed state than the spring member 20 in the first engagement state. In the ratcheting state, a back surface of the first dog member 11 on a disengaging direction X2 side may be brought into contact with the first stopper portion 34.

For example, when the difference between a rotational speed of the first dog member 11 and a rotational speed of the second dog member 12 is large, even when the position of the engaging pin 32 in the axial direction is at the first engagement position B, there may be a case where the meshing engagement device 1 is brought into the ratcheting state. The first dog member 11 can be made to stroke in the engaging direction X1 side by a biasing force of the spring member 20 such that the first engaging teeth 11a mesh with the second engaging teeth 12a when the difference between a rotational speed of the first dog member 11 and a rotational speed of the second dog member 12 decreases in the ratcheting state. That is, the ECU 50 can stands by the shifting of the meshing engagement device 1 from the ratcheting state to the first engagement state while holding a rotation phase of the shift drum 40 by holding a rotation phase of the actuator 2. That is, it is possible to move the first dog member 11 toward an engaging direction X1 side only by a biasing force of the spring member 20 without making the movable member 30 stroke in the axial direction.

When the meshing engagement device 1 does not assume the ratcheting state but assumes the first engagement state in the second state, the ECU 50 further changes a rotational phase of the shift drum 40 in an engaging direction by controlling the actuator 2 such that the position of the engaging pin 32 in the axial direction is changed from the first engagement position B to the second engagement position C. Then, when the position of the engaging pin 32 in the axial direction assumes the second engagement position C, the shifting of the meshing engagement device 1 from the second state to the third state has been completed.

Figure 5:
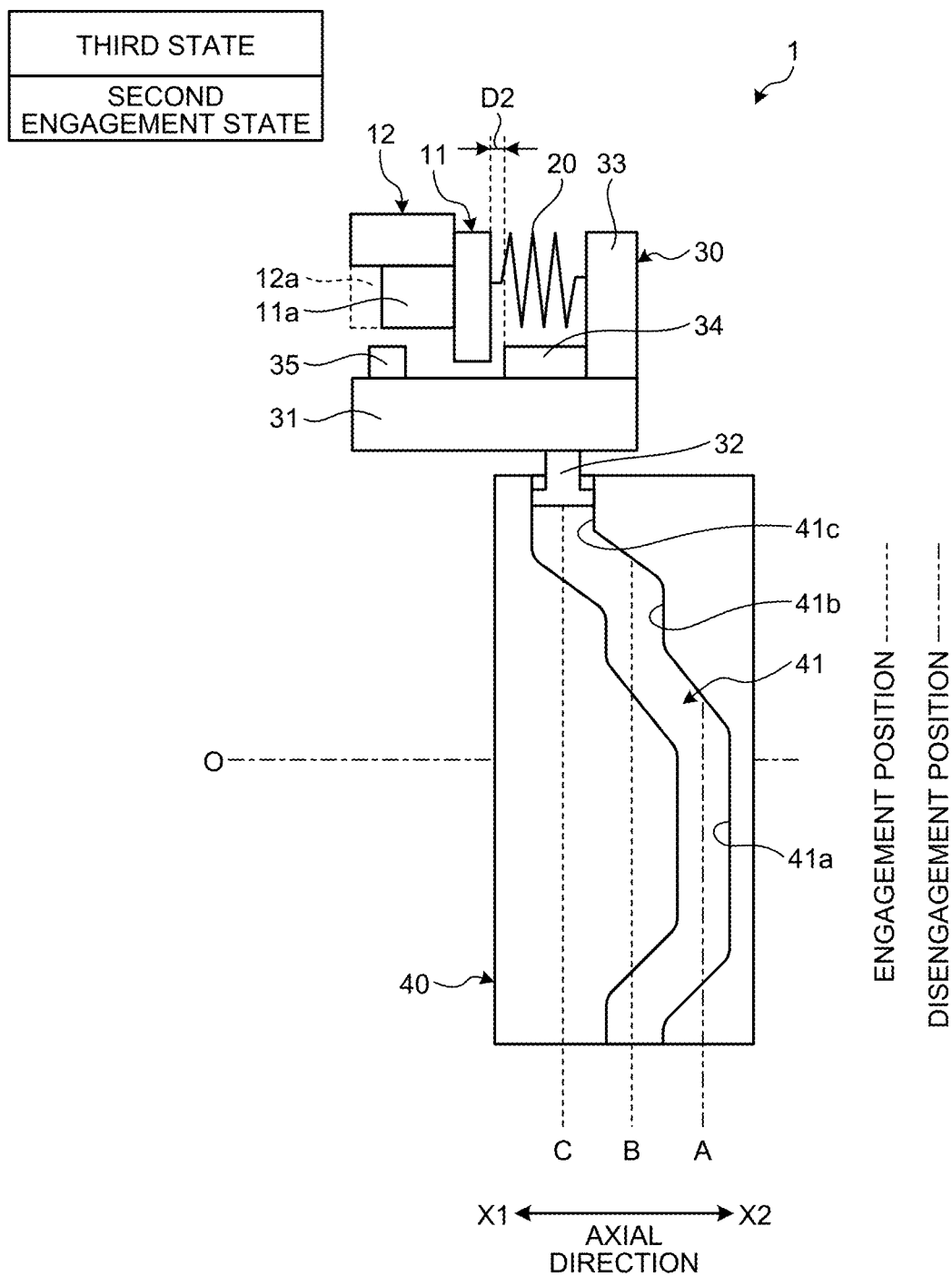
FIG. 5 is a schematic view illustrating the meshing engagement device in a third state.

FIG. 5 is a schematic view illustrating the meshing engagement device 1 in a third state. The third state means a state where the position of the engaging pin 32 in the axial direction becomes the second engagement position C. That is, the third state is a state where the engaging pin 32 engages the third groove portion 41c. Then, the meshing engagement device 1 in the third state assumes the second engagement state where the first dog member 11 and the second dog member 12 mesh with each other. That is, the third state is synonymous with the engagement state.

As illustrated in FIG. 5, in a case where the meshing engagement device 1 assumes the third state, the first dog member 11 is pushed by the spring member 20 toward an engaging direction X1 side at the position away from the second stopper portion 35. In the third state, the movable member 30 further strokes in the engaging direction X1 side while the first engaging teeth 11a are held in a meshed state with the second engaging teeth 12a, and a distance D2 in the axial direction between the holding portion 33 of the movable member 30 and the first dog member 11 is decreased thus bringing about a state where the spring member 20 is further compressed. Accordingly, the distance D2 in the axial direction between the first dog member 11 and the first stopper portion 34 is further decreased in the second engagement state compared to the first engagement state. That is, a load acting on the first dog member 11 from the spring member 20 in the engaging direction X1 is larger in the second engagement state than in the first engagement state. In other words, in a case where a load in the disengaging direction X2 acts on the first dog member 11 due to a disturbance or the like, the first dog member 11 in the second engagement state is hard to move in the disengaging direction X2 compared to the first dog member 11 in the first engagement state.

Furthermore, in the third state, the distance D2 in the axial direction between the first stopper portion 34 and the first dog member 11 is set such that even when the first dog member 11 moves toward the disengaging direction X2 side and reaches the position where the first dog member 11 is brought into contact with the first stopper portion 34, the first engaging teeth 11a are not removed from the second engaging teeth 12a. That is, in the third state, even when the first dog member 11 moves toward the disengaging direction X2 side against a biasing force of the spring member 20, the movement of the first dog member 11 is restricted by the first stopper portion 34. Further, in a state where the first dog member 11 is brought into contact with the first stopper portion 34, the first engaging teeth 11a are in a state where the first engaging teeth 11a are not removed from the second engaging teeth 12a. That is, the axial direction distance D2 in the third state is set to be shorter than the axial length of the first engaging teeth 11a. In this manner, in the third state, regardless of a magnitude of a biasing force of the spring member 20, it is possible to structurally prevent the removal of the first engaging teeth 11a by the first stopper portion 34.

In this manner, a state of the meshing engagement device 1 is changed to a first engagement state or a second engagement state corresponding to a size of the distance D2 in the axial direction between the first dog member 11 and the first stopper portion 34 even in the engagement state where the first engaging teeth 11a of the first dog member 11 and the second engaging teeth 12a of the second dog member 12 engage with each other. The ECU 50 controls the state of the meshing engagement device 1 by controlling the actuator 2.

Figure 6:
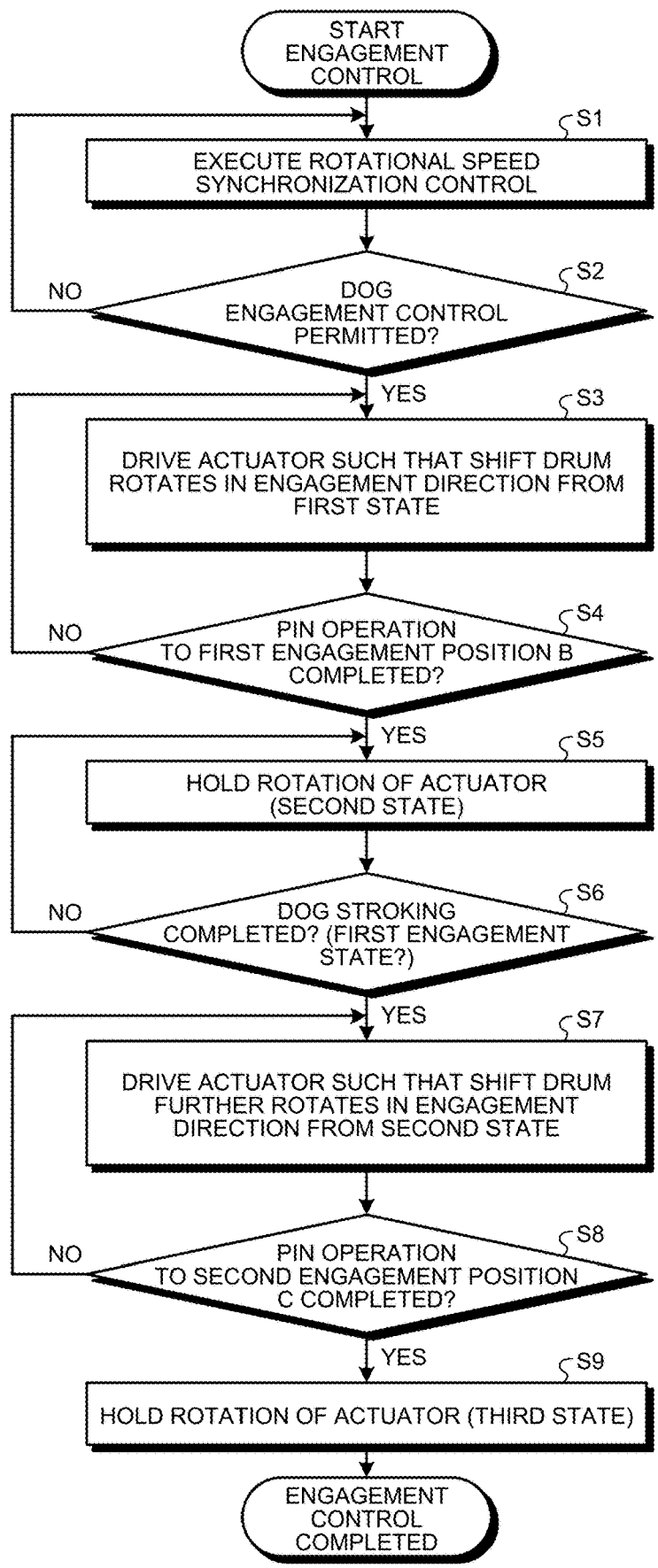
FIG. 6 is a flowchart illustrating engagement control.

FIG. 6 is a flowchart illustrating the engagement control. The control illustrated in FIG. 6 is executed by the ECU 50. When the control illustrated in FIG. 6 is started, the meshing engagement device 1 is in a disengagement state.

When the engagement control is started, the ECU 50 executes rotational speed synchronization control of the first dog member 11 and the second dog member 12 (step S1). In step S1, control for synchronizing a rotational speed of the first dog member 11 and a rotational speed of the second dog member 12 is performed such that a difference between the rotational speed of the first dog member 11 and the rotational speed of the second dog member 12 falls within a predetermined range. This predetermined range is a value set in advance, and is stored in the memory part of the ECU 50. For example, a predetermined range (difference in a rotational speed) is set to a degree of difference in a rotational speed which does not generate an engagement shock when the first dog member 11 and the second dog member 12 mesh with each other. The predetermined range may include a case where the difference in a rotational speed is zero. The ECU 50 can detect a rotational speed of the first dog member 11 and a rotational speed of the second dog member 12 based on input signals from rotational speed sensors.

The ECU 50 determines whether the execution of the engagement control of the first dog member 11 and the second dog member 12 is to be permitted (step S2). In step S2, it is determined by rotational speed synchronization control in step S1 whether a difference in rotational speed between a rotational speed of the first dog member 11 and a rotational speed of the second dog member 12 falls within a predetermined range.

In a case where the execution of the engagement control of the first dog member 11 and the second dog member 12 is not permitted (step S2: No), the control routine returns to step S1.

In a case where the execution of the engagement control of the first dog member 11 and the second dog member 12 is permitted (step S2: Yes), the ECU 50 rotates the shift drum 40 in the engaging direction by driving the actuator 2 such that a state of the meshing engagement device 1 is shifted from the first state to the second state (step S3). In step S3, the actuator 2 is driven such that a rotation phase of the shift drum 40 changes in the engaging direction from the disengagement position A in the first state to the first engagement position B in the second state. That is, in step S3, the ECU 50 executes first engagement control. In step S3, the engaging pin 32 is operated such that the position of the engaging pin 32 in the axial direction changes from the disengagement position A to the first engagement position B.

The ECU 50 determines whether the position of the engaging pin 32 in the axial direction becomes the first engagement position B and whether the operation of the engaging pin 32 toward the first engagement position B has been completed (step S4). In step S4, it is possible to determine whether the position of the engaging pin 32 in the axial direction is at the first engagement position B based on a rotation phase of the actuator 2.

In a case where the position of the engaging pin 32 in the axial direction does not change to the first engagement position B and the operation of the engaging pin 32 toward the first engagement position B is not completed (step S4: No), this control routine returns to step S3.

In a case where the position of the engaging pin 32 in the axial direction becomes the first engagement position B so that the operation of the engaging pin 32 toward the first engagement position B has been completed (step S4: Yes), the ECU 50 holds the rotation of actuator 2 (step S5). In step S5, the ECU 50 stops the operation of the actuator 2, and stops the rotation of the shift drum 40. In step S5, the ECU 50 executes stop control for stopping the rotation of the actuator 2. Accordingly, the position of the engaging pin 32 in the axial direction is maintained at the first engagement position B. In a case where the position of the engaging pin 32 in the axial direction is maintained at the first engagement position B, the meshing engagement device 1 is maintained in the second state.

The ECU 50 determines whether the stroking of the first dog member 11 has been completed (step S6). In step S6, it is determined whether the first engaging teeth 11a of the first dog member 11 mesh with the second engaging teeth 12a of the second dog member 12. That is, in step S6, in a state where the position of the engaging pin 32 in the axial direction is at the first engagement position B, it is determined whether the first engagement state is brought about where the first engaging teeth 11a mesh with the second engaging teeth 12a. For example, in a case where a rotational speed of the first dog member 11 and a rotational speed of the second dog member 12 agree with each other, the ECU 50 can determine that the dog stroking has been completed in step S6.

In a case where the stroking of the first dog member 11 has not been completed (step S6: No), the control routine returns to step S5.

In a case where the stroking of the first dog member 11 has been completed (step S6: Yes), the ECU 50 further rotates the shift drum 40 in the engaging direction by driving the actuator 2 so as to shift the meshing engagement device 1 from the second state to the third state (step S7). In step S7, the actuator 2 is driven such that a rotation phase of the shift drum 40 changes in the engaging direction from a first engagement position B in a second state to a second engagement position C in a third state. That is, in step S7, the ECU 50 restarts driving the actuator 2 and executes second engagement control. In this step S7, the engaging pin 32 is operated such that the position of the engaging pin 32 in the axial direction changes from the first engagement position B to the second engagement position C.

The ECU 50 determines whether the position of the engaging pin 32 in the axial direction becomes the second engagement position C and the operation of the engaging pin 32 toward the second engagement position C has been completed (step S8). In step S8, it is possible to determine whether the position of the engaging pin 32 in the axial direction is at the second engagement position C based on the rotation phase of the actuator 2.

In a case where the position of the engaging pin 32 in the axial direction is not changed to the second engagement position C so that the operation of the engaging pin 32 toward the second engagement position C has not been completed (step S8: No), this control routine returns to step S7.

When the position of the engaging pin 32 in the axial direction becomes the second engagement position C and the operation of the engaging pin 32 toward the second engagement position C has been completed (step S8: Yes), the ECU 50 holds the rotation of the actuator 2 (step S9). In step S9, the ECU 50 stops the operation of the actuator 2, and stops the rotation of the shift drum 40.

Accordingly, the position of the engaging pin 32 in the axial direction is maintained at the second engagement position C. In a case where the position of the engaging pin 32 in the axial direction is maintained at the second engagement position C, the meshing engagement device 1 is maintained in the third state. When step S9 is performed, the control routine is finished.

As has been described above, according to the embodiment, by controlling the meshing engagement device 1 to a second engagement state, even when a load in the disengaging direction X2 acts on the first dog member 11, the first stopper portion 34 restricts the movement of the first dog member 11 toward the disengaging direction X2 side and hence, the meshing state between the first engaging teeth 11a and the second engaging teeth 12a can be maintained. Accordingly, in the meshing engagement device 1, it is possible suppress the occurrence of a case where the meshing state is erroneously disengaged during the engagement.

The present disclosure is not limited to the above-described embodiment, and the present disclosure may be appropriately modified without departing from the object of the present disclosure.

For example, in the above-described embodiment, the description has been made with respect to the method where the position of the engaging pin 32 in the axial direction is determined based on a rotation phase of the actuator 2. However, the present disclosure is not limited to such a method. As a modification, the position of the movable member 30 in the axial direction, the position of the engaging pin 32 in the axial direction or the position of the first dog member 11 in the axial direction may be detected using a stroke sensor.

Figure 7:
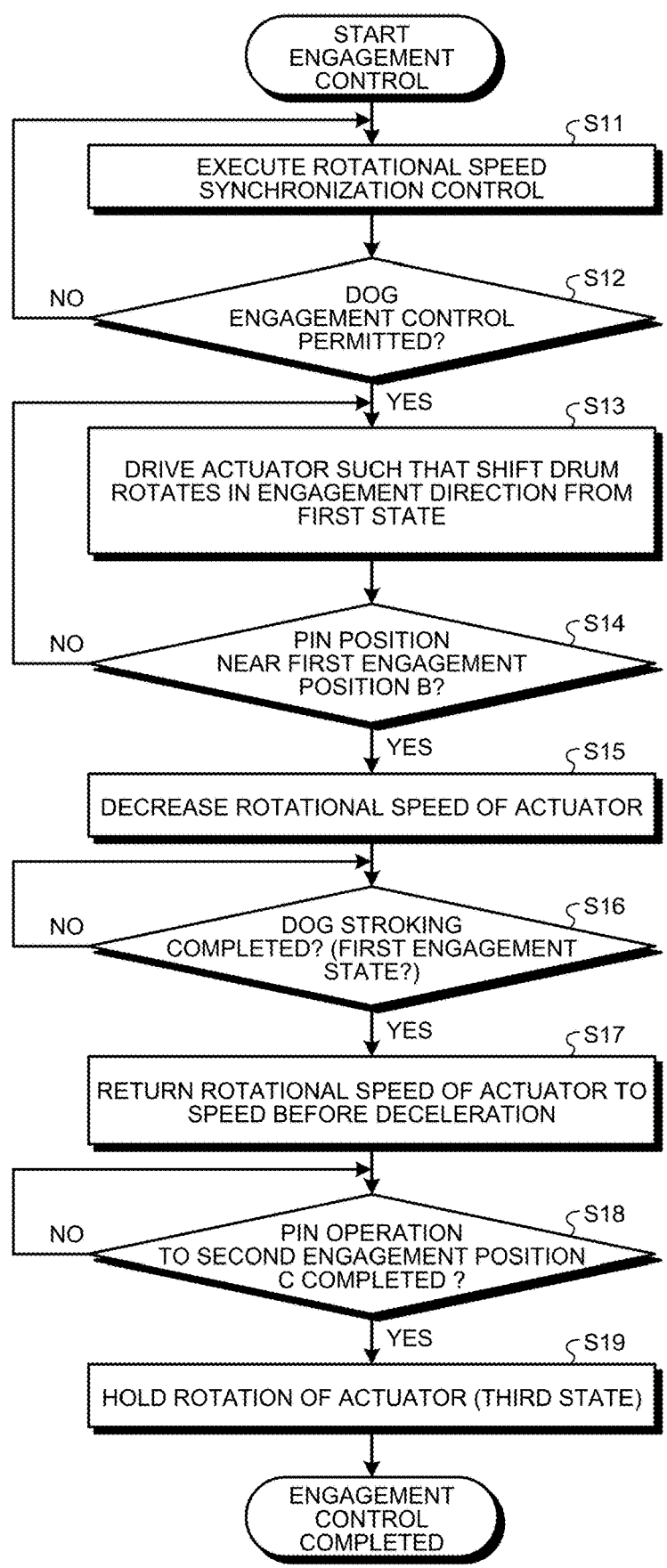
FIG. 7 is a flowchart illustrating a modification of the engagement control.
Figure 8:
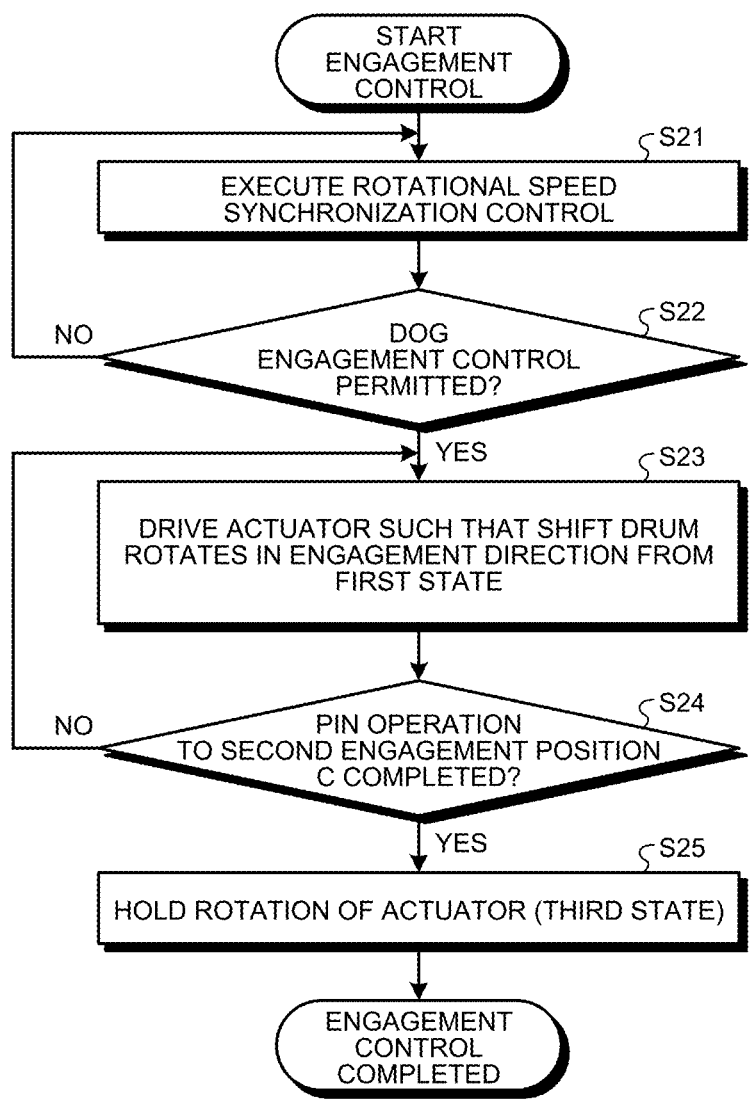
FIG. 8 is a flowchart illustrating a reference example of the engagement control.

Further, as a modification of the above-described embodiment, to enhance the responsiveness of an engaging operation in the meshing engagement device 1, when the position of the engaging pin 32 in the axial direction becomes the first engagement position B, the operation of the actuator 2 may be continued without temporarily stopping the actuator 2. FIG. 7 illustrates this modification of the engagement control. FIG. 8 illustrates a reference example.

FIG. 7 is a flowchart illustrating the modification of the engagement control. Unlike the control illustrated in FIG. 6, in the control illustrated in FIG. 7, when the position of the engaging pin 32 in the axial direction becomes the first engagement position B, the ECU 50 executes deceleration control for decelerating a rotational speed of the shift drum 40. Steps S11 to S13 in FIG. 7 are the same processing as steps S1 to S3 in FIG. 6, and steps S18 to S19 in FIG. 7 are the same processing as steps S8 to S9 in FIG. 6. Accordingly, the description of the steps S11 to S13 and the steps S18 to S19 in FIG. 7 are omitted in the description of this modification.

As illustrated in FIG. 7, after executing the processing in step S13, the ECU 50 determines whether the position of the engaging pin 32 in the axial direction is near the first engagement position B (step S14). In step S14, it is determined whether the engaging pin 32 is positioned within a predetermined range in front of and behind the first engagement position B. This predetermined position is set within a range including the first engagement position B. That is, when the engaging pin 32 moves in the axial direction from the disengagement position A toward the first engagement position B, even before the position of the engaging pin 32 in the axial direction reaches the first engagement position B, in a case where the position of the engaging pin 32 in the axial direction falls within the above-described predetermined range, the affirmative determination is made in step S14. In the same manner, even in a case where the engaging pin 32 has passed the first engagement position B, in a case where the position of the engaging pin 32 in the axial direction falls within the above-described predetermined range, the affirmative determination is made in step S14.

In a case where the position of the engaging pin 32 in the axial direction is not near the first engagement position B (step S14: No), this control routine returns to Step S13.

In a case where the position of the engaging pin 32 in the axial direction is near the first engagement position B (step S14: Yes), the ECU 50 decreases a rotational speed of the actuator 2 (step S15). In step S15, the ECU 50 executes the deceleration control of the actuator 2.

In step S15, with respect to the actuator 2 which is rotating due to the processing in step S13, a rotational speed of the actuator 2 is decreased more than a rotational speed of the actuator 2 before the determination processing is performed in step S14. This deceleration is not the deceleration intended to stop the rotation of the actuator 2, but means changing of a speed to a low speed. That is, when the processing in step S15 is performed, a speed of the actuator 2 is controlled to a decelerated constant speed. When the position of the engaging pin 32 in the axial direction is near the first engagement position B, there may be a case where the meshing engagement device 1 may assume the ratcheting state. Accordingly, in step S15, a rotational speed of the actuator 2 is decreased so as to ensure a time necessary for the first dog member 11 in the ratcheting state to mesh with the second dog member 12.

The ECU 50 determines whether the stroke of the first dog member 11 has been completed in a state where the actuator 2 is driven at the reduced speed (step S16). The determination method in step S16 is the same as the determination method in step S6 in FIG. 6 described above.

In a case where the stroke of the first dog member 11 has not been completed (step S16: No), this control routine loops in step S16.

In a case where the stroking of the first dog member 11 has been completed (step S16: Yes), the ECU 50 returns a rotational speed of the actuator 2 to a speed before deceleration is performed (step S17). In step S17, the ECU 50 finishes the deceleration control and executes return control to return a rotational speed of the actuator 2 to a speed before deceleration is performed.

When the ECU 50 executes the return control, a rotational speed of the actuator 2 becomes relatively higher than the rotational speed before the return control is executed. That is, comparing a rotational speed of the actuator 2 before and after the execution of the processing in step S17, the rotational speed of the actuator 2 is increased after the execution of processing in step S17 compared to the rotational speed before the execution of the processing in step S17. In short, the ECU 50 executes speed control for increasing a rotational speed of the actuator 2 in a case where the meshing engagement device 1 is not in the ratcheting state. The processing in step S17 is executed in the first engagement state and hence, the movable member 30 can be stroked toward an engaging direction X1 side in a state where the first engaging teeth 11a mesh with the second engaging teeth 12a. Accordingly, a time which the movable member 30 takes until the movable member 30 completes the stroking can be decreased. After performing the processing in step S17, the control routine advances to step S18.

As described above, according to the modification illustrated in FIG. 7, by decreasing a rotational speed of the actuator 2 without stopping the rotation of the actuator 2 near the first engagement position B during the engaging operation (transition period of engagement), it is possible to ensure a time until the first engaging teeth 11a mesh with the second engaging teeth 12a in the ratcheting state. Thereby, the response performance of the engaging operation in the meshing engagement device 1 can be enhanced as compared with the case where the actuator 2 is temporarily stopped during the transition period of engagement.

FIG. 8 is a flowchart illustrating a reference example of the engagement control. Unlike the control illustrated in FIG. 6 or FIG. 7 described above, an engagement control illustrated in FIG. 8 is executed such that processing are performed in series from a disengagement state to a second engagement state neither temporarily stopping the actuator 2 nor decreasing a rotational speed of the actuator 2 during a transition period of engagement. Steps S21 and S22 in FIG. 8 are the same processing as steps S1 and S2 in FIG. 6, and step S25 in FIG. 8 is the same processing as step S9 in FIG. 6. Accordingly, the description of these steps is omitted with respect to the reference example.

As illustrated in FIG. 8, when the execution of the engagement control between the first dog member 11 and the second dog member 12 is permitted (step S22: Yes), the ECU 50 drives the actuator 2 so as to rotate the shift drum 40 in the engaging direction and hence, the meshing engagement device 1 is shifted from a first state to a third state (step S23). In step S23, the actuator 2 is driven such that a rotational phase of the shift drum 40 changes in the engaging direction from the disengagement position A in a first state to the second engagement position C in a third state via the first engagement position B in a second state. That is, in step S23, the ECU 50 executes the first engagement control and the second engagement control in a series. At such processing, the ECU 50 allows the shift drum 40 to continuously rotate without changing a rotational speed of the actuator 2. In this step S23, the engaging pin 32 is operated such that the position of the engaging pin 32 in the axial direction changes from the disengagement position A to the second engagement position C.

After the processing is step S23 is executed, the ECU 50 determines whether the position of the engaging pin 32 in the axial direction is becomes the second engagement position C so that the operation of the engaging pin 32 toward the second engagement position C from the disengagement position A has been completed (step S24). The processing in step S24 is the same as the processing of step S8 in FIG. 6 described above.

When the position of the engaging pin 32 in the axial direction does not change to the second engagement position C so that the operation of the engaging pin 32 toward the second engagement position C from the disengagement position A has not been completed (step S24: No), the control routine returns to step S23.

In a case where the position of the engaging pin 32 in the axial direction becomes the second engagement position C so that the operation of the engaging pin 32 toward the second engagement position C from the disengagement position A has been completed (step S24: Yes), this control routine advances to step S25.

As described above, according to the reference example illustrated in FIG. 8, it is possible to shift the state of engagement from the disengagement state to the second engagement state by neither stopping nor decreasing the rotation of the actuator 2 during the engaging operation (transition period of engagement). As a result, the responsiveness of the engaging operation in the meshing engagement device 1 can be improved as compared with the case where the actuator 2 is temporarily stopped or decelerated during the transition period of engagement.

Note that, in the above-described embodiment and each modified example, the example in which the actuator 2 is configured by the electrically-operated motor has been described, but the present disclosure is not limited to such a configuration. For example, the actuator 2 may not be limited to a rotary actuator, and may be an actuator that operates in the axial direction (linear motion actuator). Accordingly, a rotational speed of the actuator 2 described above can be read as an operation speed of the actuator 2.

Figure 9:
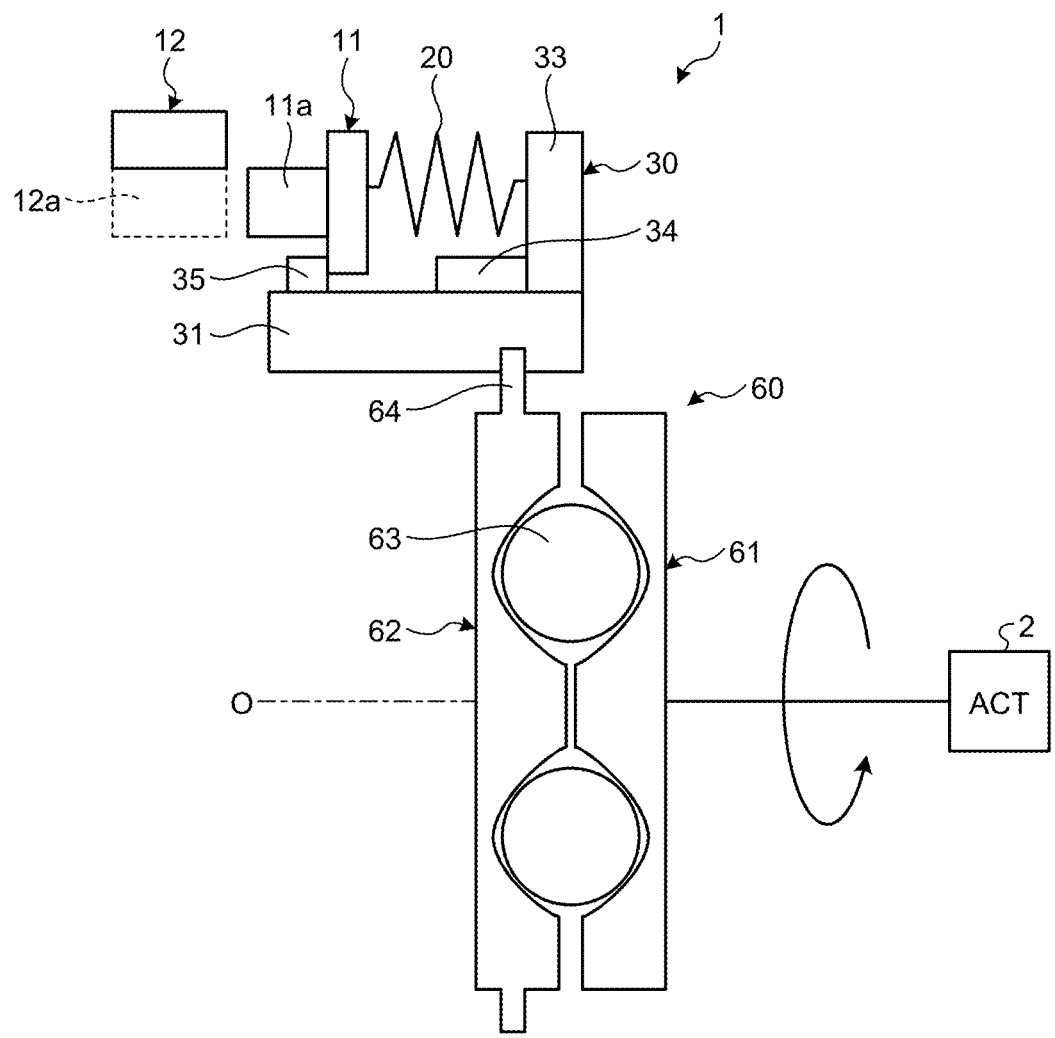
FIG. 9 is a schematic view illustrating a case where the meshing engagement device is provided with a torque cam mechanism.
Figure 10:
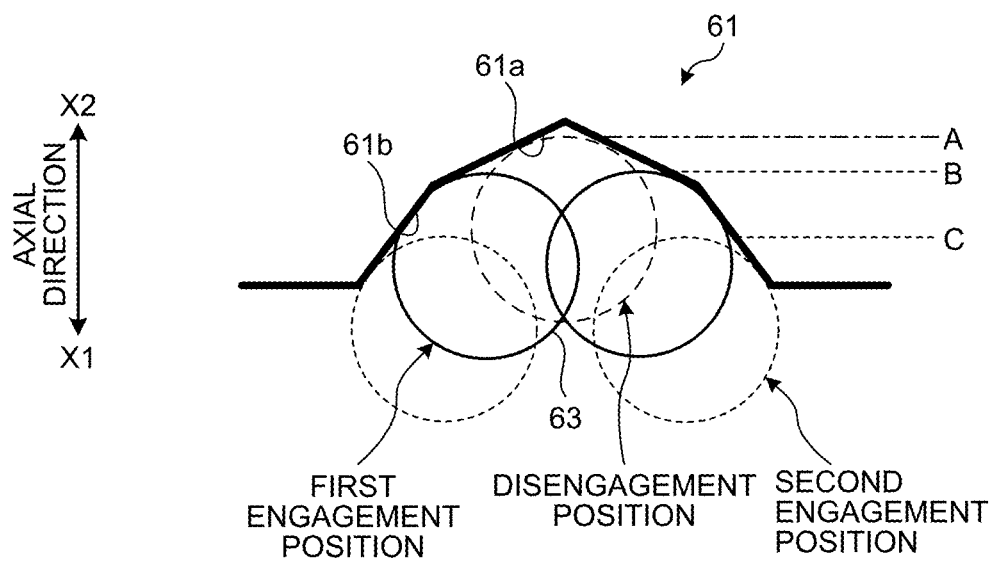
FIG. 10 is an explanatory view illustrating a shape of a cam surface and positions of a cam ball.
Figure 11:
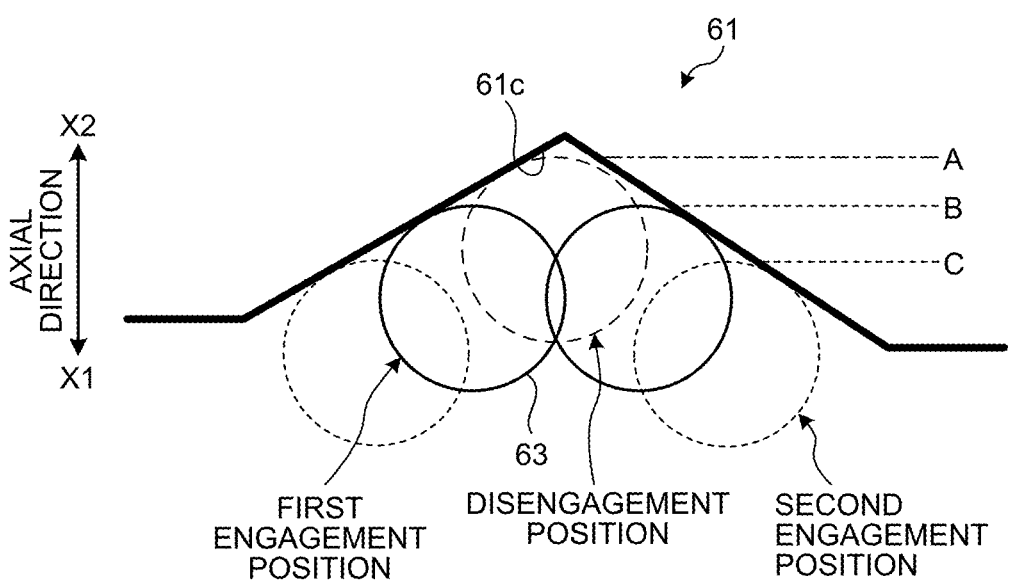
FIG. 11 is an explanatory view illustrating another shape of the cam surface and positions of the cam ball.

Further, as a modification of the structure of the meshing engagement device 1, it is possible to adopt a configuration having a torque cam mechanism in place of the shift drum 40. FIGS. 9 to 11 illustrate the structure of a modified meshing engagement device 1 including a torque cam mechanism. In the description of this modification, the description of the same configuration as the configuration of the above-described meshing engagement device 1 is omitted.

FIG. 9 is a schematic view illustrating a case where a meshing engagement device 1 includes a torque cam mechanism. The meshing engagement device 1 of the modification includes a torque cam mechanism 60 in place of the shift drum 40 as a mechanism for moving a movable member 30 in the axial direction. The torque cam mechanism 60 includes a first cam member 61 on an input side, a second cam member 62 on an output side, and cam balls 63.

The first cam member 61 is a rotary member formed in a circular shape, and rotates due to driving of an actuator 2. The first cam member 61 is connected to the actuator 2 and rotates at a position fixed in the axial direction. For example, a rotation shaft of the actuator 2 and the first cam member 61 rotate integrally with each other. The second cam member 62 is a rotary member formed in a circular shape, and is arranged so as to opposedly face the first cam member 61 in the axial direction. The second cam member 62 is disposed more on a disengaging direction X2 side than the first cam member 61. The cam balls 63 are held in a state where the cam balls 63 are sandwiched between a cam surface of the first cam member 61 and a cam surface of the second cam member 62. The torque cam mechanism 60 is configured such that when the cam balls 63 roll on the cam surfaces, the position of the cam balls 63 in the axial direction and the position of the second cam member 62 in the axial direction are changed. Further, the first cam member 61 and the second cam member 62 are biased in a direction that the first cam member 61 and the second cam member 62 approach each other (axial direction). Since the position of the first cam member 61 in the axial direction is fixed, the second cam member 62 is biased in a direction that the second cam member 62 approaches the first cam member 61.

A connecting pin 64 which protrudes outward in the radial direction is formed on the second cam member 62. The connecting pin 64 is a portion which forms a connecting portion with the movable member 30. A connecting pin 64 is mounted on the inner peripheral portion of the body portion 31. Thereby, the second cam member 62 and the movable member 30 are integrally connected to each other. That is, the movable member 30 moves in the axial direction integrally with the second cam member 62, and rotates integrally with the second cam member 62. Note that the movable member 30 and the first dog member 11 are configured to be relatively rotatable.

When the first cam member 61 rotates due to driving of the actuator 2, when the first cam member 61 and the second cam member 62 rotate relative to each other, the cam ball 63 rolls on the cam surface, and the second cam member 62 moves in the axial direction. That is, the second cam member 62 moves relative to the first cam member 61 in the axial direction. When the second cam member 62 moves in the axial direction, the movable member 30 also moves integrally with the second cam member 62. Then, the position of the second cam member 62 in the axial direction changes corresponding to the position of the cam ball 63 in the axial direction.

FIG. 10 is an explanatory view illustrating the shape of the cam surface and the position of the cam ball 63. As illustrated in FIG. 10, corresponding to the shapes of first and second cam surfaces 61a and 61b formed on the first cam member 61, the position of the cam ball 63 in the axial direction changes among a disengagement position A, a first engagement position B, and a second engagement position C. The cam surface of the first cam member 61 has the first cam surfaces 61a and the second cam surfaces 61b which differ in an inclination angle with respect to the rotation direction. That is, an inclination angle of the cam surface of the first cam member 61 is set in two stages.

The first cam surfaces 61a are cam surfaces formed on the cam groove at a deep position, and are set to have a gentle inclination angle with respect to the rotation direction. The second cam surfaces 61b are cam surfaces formed on the cam groove at a shallow position in the cam groove, and are set to have a steep inclination angle with respect to the rotation direction. In a case where a rotation amount of the first cam member 61 is the same, a movement amount in the axial direction of the cam ball 63 rolling on the first cam surface 61a is smaller than a movement amount in the axial direction of the cam ball 63 rolling on the second cam surface 61b.

For example, the cam ball 63 positioned at the disengagement position A is brought into contact with only the first cam surface 61a. The cam ball 63 positioned at the first engagement position B is brought into contact with the first cam surface 61a and the second cam surface 61b. The cam ball 63 positioned at the second engagement position C is brought into contact with only the second cam surface 61b. Then, the ECU 50 controls the position of the cam ball 63 and the position of the second cam member 62 in the axial direction by controlling a rotation phase of the actuator 2.

As in the case of this modification, the meshing engagement device 1 is not limited to the shift drum 40 and may include the torque cam mechanism 60.

The shape of the cam surface of the first cam member 61 is not limited to the shape in which the inclination angle changes in two stages. As illustrated in FIG. 11, the shape of the cam surface of the first cam member 61 may be a cam surface 61c formed contiguously at the same inclination angle.

Further, the above-described meshing engagement device 1 is applicable to a drive device of a vehicle.

Figure 12:
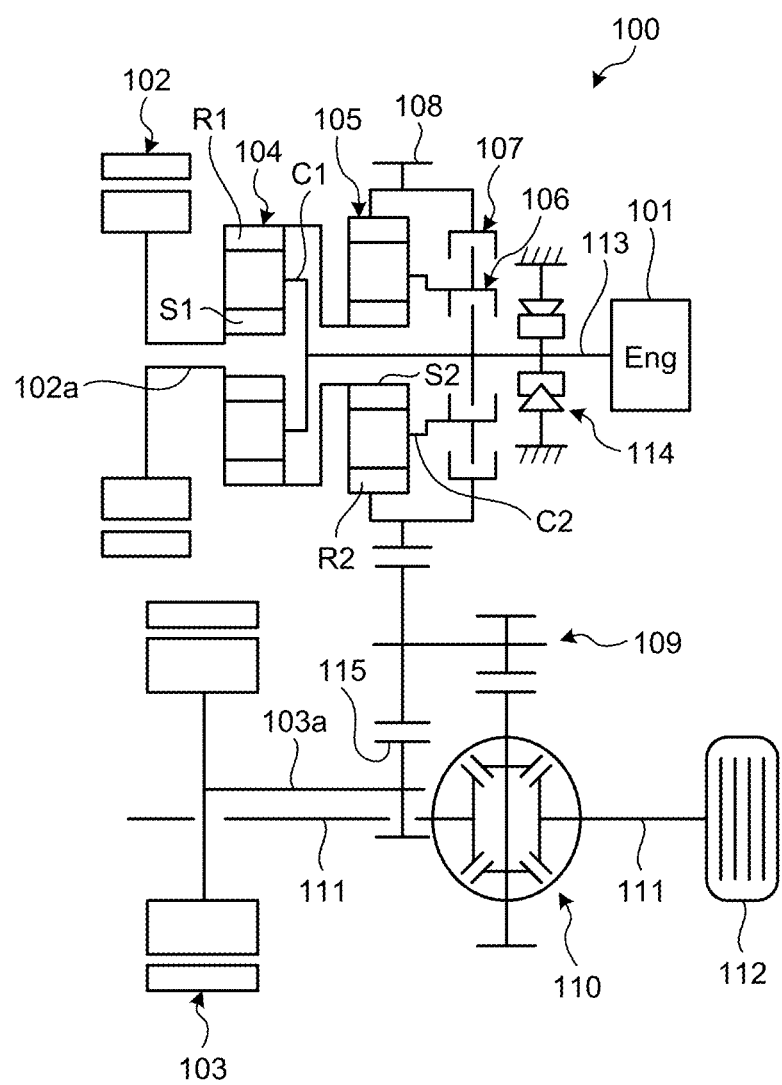
FIG. 12 is a skeleton view illustrating a drive device of a vehicle to which the meshing engagement device is applicable.

FIG. 12 is a skeleton view illustrating a drive device of vehicle to which the meshing engagement device 1 is applicable. As illustrated in FIG. 12, a vehicle drive device 100 includes: an engine (Eng) 101; a first motor 102; a second motor 103; a first planetary gear mechanism 104; a second planetary gear mechanism 105; a first clutch 106; a second clutch 107; an output gear 108; a counter gear mechanism 109; a differential device 110; a drive shaft 111; and a drive wheel 112. The output gear 108 outputs a torque transmitted from the second planetary gear mechanism 105 to the drive wheel 112. The above-described meshing engagement device 1 is applicable to the first clutch 106 and the second clutch 107.

The first planetary gear mechanism 104 is a power dividing mechanism which divides power which the engine 101 outputs into power on a first motor 102 side and power on an output gear 108 side. The first planetary gear mechanism 104 is formed of a single pinion type planetary gear mechanism. The first planetary gear mechanism 104 includes a first sun gear S1, a first carrier C1, and a first ring gear R1 as rotating elements. The first sun gear S1 is a reaction force element to which the first motor 102 is connected. The first ring gear R1 is an output element. The first carrier C1 is an input element to which the engine 101 is connected.

An output shaft of the engine 101 is connected to an input shaft 113. The direction that the input shaft 113 can rotate is restricted to only one direction by a one-way clutch 114. The input shaft 113 is connected to the first carrier C1 of the first planetary gear mechanism 104. A rotor 102a of the first motor 102 is connected to the first sun gear S1 of the first planetary gear mechanism 104. The first planetary gear mechanism 104 and the first motor 102 are arranged adjacently to each other in the axial direction of the input shaft 113. The first motor 102 is arranged on a side opposite to the engine 101 in the axial direction with the first planetary gear mechanism 104 sandwiched between the first motor 102 and the engine 101.

The second planetary gear mechanism 105 is disposed parallel to each other in the axial direction between the first planetary gear mechanism 104 and the engine 101. The second planetary gear mechanism 105 is a transmission unit. The second planetary gear mechanism 105 includes, as rotating elements, a second sun gear S2, a second ring gear R2, and a second carrier C2. A first ring gear R1 is connected to the second sun gear S2. The output gear 108 is connected to the second ring gear R2.

The first clutch 106 is an engagement device which can selectively connects the second carrier C2 and the first carrier C1. The first clutch 106 can be formed of the above-described meshing engagement device 1. Then, the first planetary gear mechanism 104 and the second planetary gear mechanism 105 connect the first carrier C1 and the second carrier C2 by bringing the first clutch 106 in an engagement state thus forming a composite planetary gear mechanism where these elements form input elements. A composite planetary gear mechanism is formed where a first sun gear S1 of the first planetary gear mechanism 104 is used as a reaction force element and a second ring gear R2 of the second planetary gear mechanism 105 is used as an output element.

The second clutch 107 is a clutch for integrally rotating rotating elements of the second planetary gear mechanism 105. The second clutch 107 is an engagement device which selectively connects a second carrier C2 and a second ring gear R2. This second clutch 107 can be formed of the above-mentioned meshing engagement device 1. Further, the first clutch 106 and the second clutch 107 are arranged on the same rotation center axis, and are arranged at the position where the first clutch 106 and the second clutch 107 overlap each other in the axial direction. In the example illustrated in FIG. 12, the first clutch 106 is arranged inside the second clutch 107 in the radial direction.

A drive gear 115 mounted on a rotor shaft 103a of the second motor 103 meshes with a driven gear of the counter gear mechanism 109. Power which the second motor 13 outputs is added to power output from the output gear 108 by the counter gear mechanism 109. Power obtained by synthesizing the powers as described above is output from the differential device 110 to left and right drive shafts 111. The drive wheel 112 is mounted on the drive shaft 111.

According to the present disclosure, it is possible to suppress the occurrence of a case where a meshing state between the engaging teeth is erroneously disengaged when a load in the disengaging direction acts on the dog member in an engagement state.

According to an embodiment, the movement of a first engaging element in a disengaging direction can be restricted by a stopper portion and hence, it is possible to suppress the occurrence of a case where first engaging teeth erroneously disengage from second engaging teeth during the engagement.

According to an embodiment, a position of the movable member in the axial direction can be changed by rotating a shift drum.

According to an embodiment, a position of the movable member in the axial direction can be changed corresponding to a shape of a groove portion with which the engaging pin engages.

According to an embodiment, it is possible to move the movable member in the axial direction by a thrust force generated by the torque cam mechanism.

According to an embodiment, in a case where a ratcheting state is not yet established, an operation speed of the actuator can be increased and hence, a responsiveness of an engaging operation can be enhanced.

According to an embodiment, the operation speed of the actuator is decelerated when the ratcheting state can be established and hence, reliability of engagement is enhanced. Further, it is possible to continue the operation of the actuator in a decelerated manner without temporarily stopping the actuator and hence, a responsiveness of the engaging operation can be enhanced.

According to an embodiment, by stopping the operation of the actuator when the operation amount of the actuator becomes the operation amount corresponding to the first engagement state, reliability of engagement is enhanced.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A meshing engagement device comprising:
   a movable member configured to move in an axial direction by power from an actuator;
   a first engaging element connected to the movable member and configured to move in the axial direction by a thrust force given from the movable member;
   a spring member interposed between the movable member and the first engaging element and configured to transmit the thrust force of the movable member to the first engaging element;
   first engaging teeth formed on the first engaging element; and
   a second engaging element disposed at a position which opposedly faces the first engaging element in the axial direction, the second engaging element having second engaging teeth which engage with the first engaging teeth, wherein
   the meshing engagement device is configured to switch a state of engagement in response to a position of the movable member in the axial direction between an engagement state where the first engaging teeth and the second engaging teeth mesh with each other so that the first engaging element and the second engaging element are integrally rotatable and a disengagement state where the first engaging teeth and the second engaging teeth do not mesh with each other so that the first engaging element and the second engaging element are rotatable relative to each other, wherein
   the engagement state includes:
   a first engagement state, where the first engaging teeth and the second engaging teeth mesh with each other so that the first engaging element and the second engaging element are integrally rotatable, where the spring member is brought into a state where the spring member is contracted in the axial direction; and
   a second engagement state, where the first engaging teeth and the second engaging teeth mesh with each other so that the first engaging element and the second engaging element are integrally rotatable, where the spring member is brought into a state where the spring member is further contracted in the axial direction compared to the spring member in the first engagement state.

2. The meshing engagement device according to claim 1, further comprising a stopper portion configured to restrict a movement of the first engaging element in a disengaging direction with respect to the axial direction against an elastic force of the spring member, wherein
  in the first engagement state, an axial direction distance between the stopper portion and the first engaging element is a distance which allows the first engaging element to move in the disengaging direction to a position in the axial direction at which the first engaging teeth do not mesh with the second engaging teeth, and
  in the second engagement state, the axial direction distance between the stopper portion and the first engaging element is a distance which does not allow the first engaging element to move in the disengaging direction to a position in the axial direction at which the first engaging teeth do not mesh with the second engaging teeth.

3. The meshing engagement device according to claim 2, further comprising a shift drum configured to be rotated by power of the actuator, wherein
  the actuator is configured to output a rotational force to the shift drum,
  the movable member includes:
  an engaging pin which is fitted in a groove portion formed on the shift drum and is configured to change a position in the axial direction thereof along a shape of the groove portion along with rotation of the shift drum; and
  a body portion which is configured to move in the axial direction corresponding to the position in the axial direction of the engaging pin,
  the spring member is sandwiched between a holding portion integrally formed with the body portion and the first engaging element, and
  the stopper portion is integrally formed with the body portion.

4. The meshing engagement device according to claim 3, wherein the groove portion includes:
  a first engaging groove portion formed at a position in the axial direction which forms the first engagement state; and
  a second engaging groove portion formed at a position in the axial direction which forms the second engagement state.

5. The meshing engagement device according to claim 1, further comprising a torque cam mechanism configured to be rotated by power of the actuator, wherein
  the actuator is configured to output a rotational force to the torque cam mechanism,
  the torque cam mechanism has a first cam member and a second cam member which are disposed such that cam surfaces of the respective first cam member and second cam member opposedly face each other, the first cam member and the second cam member are configured to move relative to each other in the axial direction due to relative rotation between the first cam member and the second cam member,
  the first cam member is a cam member which is fixed to the actuator in a rotation axis direction of the actuator,
  the second cam member is a cam member configured to give a thrust force to the movable member, and
  the movable member is configured to move in the axial direction integrally with the second cam member.

6. A controller for controlling a meshing engagement device, the meshing engagement device including:
  a movable member configured to move in the axial direction by power from an actuator;
  a first engaging element connected to the movable member, and configured to move in the axial direction by a thrust force given from the movable member;
  a spring member interposed between the movable member and the first engaging element, and configured to transmit the thrust force of the movable member to the first engaging element;
  first engaging teeth formed on the first engaging element; and
  a second engaging element disposed at a position which opposedly faces the first engaging element in the axial direction, the second engaging element having second engaging teeth which mesh with the first engaging teeth, wherein
  the meshing engagement device is configured to switch a state of engagement in response to a position of the movable member in the axial direction between an engagement state where the first engaging teeth and the second engaging teeth mesh with each other so that the first engaging element and the second engaging element are integrally rotatable and a disengagement state where the first engaging teeth and the second engaging teeth do not mesh with each other so that the first engaging element and the second engaging element are rotatable relative to each other, wherein
  the controller comprises an engagement control unit configured to execute engagement control for switching the meshing engagement device from the disengagement state to the engagement state,
  the engagement control unit configured to execute first engagement control for controlling the engagement state to a first engagement state, where the first engaging teeth and the second engaging teeth mesh with each other so that the first engaging element and the second engaging element are integrally rotatable, which is a state where the spring member is contracted in the axial direction, and configured to execute second engagement control for controlling the engagement state to a second engagement state, where the first engaging teeth and the second engaging teeth mesh with each other so that the first engaging element and the second engaging element are integrally rotatable, which is a state where the spring member is further contracted in the axial direction compared to the spring member in the first engagement state after the first engagement control is executed.

7. The controller according to claim 6, wherein the meshing engagement device has a structure which allows the meshing engagement device to be brought into a ratcheting state where the first engaging teeth and the second engaging teeth do not mesh with each other and the first engaging teeth are snapped by the second engaging teeth and the spring member is extended or contracted in a case where an operation amount of the actuator is an operation amount corresponding to the first engagement state, and
  in executing the second engagement control, in a case where the operation amount of the actuator is an operation amount which corresponds to the first engagement state and in a case where the engagement state becomes the first engagement state, the engagement control unit is configured to execute speed control for increasing an operation speed of the actuator by comparing with a case where the operation amount of the actuator is an operation amount which corresponds to the first engagement state and a case where the engagement state becomes the ratcheting state thus shifting the engagement state to the second engagement state.

8. The controller according to claim 6, wherein the engagement control unit is configured to execute deceleration control for decreasing an operation speed of the actuator in a case where an operation amount of the actuator is an operation amount which corresponds to the first engagement state, and is configured to execute restoring control for restoring an operation speed of the actuator to a speed before deceleration in a case where the engagement control unit determines that the engagement state is the first engagement state and is configured to execute the second engagement control.

9. The controller according to claim 6, wherein the engagement control unit is configured to execute stop control for stopping an operation of the actuator in a case where an operation amount of the actuator becomes an operation amount which corresponds to the first engagement state during the execution of the first engagement control, and the engagement control unit is configured to restart an operation of the actuator in a case where the engagement control unit determines that the engagement state is the first engagement state after the stop control is executed, and is configured to execute the second engagement control.

* * * * *